(12) United States Patent
Zhang

(10) Patent No.: US 10,376,004 B2
(45) Date of Patent: Aug. 13, 2019

(54) PVC DISPOSABLE GLOVE AND MANUFACTURING PROCESS THEREOF

(71) Applicant: TANGSHAN TRANSOCEAN PLASTIC PRODUCTS., LTD., Tangshan (CN)

(72) Inventor: Zhentang Zhang, Tangshan (CN)

(73) Assignee: Tnagshan TransOcean Plastic Products, Ltd., Tangshan (CN)

( * ) Notice: Subject to any disclaimer, the term of this patent is extended or adjusted under 35 U.S.C. 154(b) by 501 days.

(21) Appl. No.: 15/100,719

(22) PCT Filed: Dec. 9, 2014

(86) PCT No.: PCT/CN2014/093395
§ 371 (c)(1),
(2) Date: Jun. 1, 2016

(87) PCT Pub. No.: WO2015/085908
PCT Pub. Date: Jun. 18, 2015

(65) Prior Publication Data
US 2016/0286875 A1    Oct. 6, 2016

(30) Foreign Application Priority Data

Dec. 10, 2013   (CN) .......................... 2013 1 0666737
Dec. 10, 2013   (CN) .......................... 2013 1 0669629
(Continued)

(51) Int. Cl.
*A41D 19/04*       (2006.01)
*A41D 19/00*       (2006.01)
(Continued)

(52) U.S. Cl.
CPC ..... *A41D 19/0082* (2013.01); *A41D 19/0058* (2013.01); *B29C 65/02* (2013.01);
(Continued)

(58) Field of Classification Search
CPC ............ A41D 19/0055; A41D 19/0006; A41D 19/02; A41D 19/04; A61B 42/10
See application file for complete search history.

(56) References Cited

U.S. PATENT DOCUMENTS

2013/0086732 A1    4/2013   Hofmeister et al.
2014/0090148 A1 *  4/2014   Tao ........................ A41D 19/02
                                                          2/167
(Continued)

FOREIGN PATENT DOCUMENTS

CA    2527391 A1 *   1/2005   ......... A41D 19/0055
CN    1729882 A       2/2006
(Continued)

*Primary Examiner* — Tajash D Patel
(74) *Attorney, Agent, or Firm* — Vos-IP, LLC

(57) ABSTRACT

A type of PVC related disposable gloves and the manufacturing process thereof. The process includes: The PVC resin or its mixture is mixed with a plasticizer to form a glove formula mixture. The films of glove material mixture are formed with the said glove formula mixture. Two layers of the said films of glove material mixture are placed in parallel to form the glove material films An insulation layer is placed on one side of the glove material films, and a beam of electromagnetic waves is applied and distributed along a path of preset contour onto the surface of the glove material films so that the electromagnetic beam penetrates the glove material films and, as the result, the two layers of the glove material films are effectively sealed and joined along the path of preset contour; Or thermal heat is applied and distributed along a path of preset contour onto the surface of the glove material films so that the heating temperature is equal to or higher than the critical point of heat sealing temperature of the glove material films and, as the result, the two layers of the glove material films are effectively sealed and joined along the path of preset contour. Pressure is applied on the glove material films along the path of preset (Continued)

contour so that the two layers of the glove material films are fused integrally along the path of preset contour. A cutting edge is applied along the outer path of preset contour, and the inner part of the path of preset contour including the fused part is separated from the glove material films, while an opening at the wrist is cut, so that a piece of the PVC related disposable glove is formed. This manufacturing process of the PVC related disposable gloves greatly reduces the environmental pollutions and has a very high value for in protecting the environment.

13 Claims, 1 Drawing Sheet

(30) Foreign Application Priority Data

Dec. 10, 2013 (CN) .................. 2013 2 0806940 U
Dec. 10, 2013 (CN) .................. 2013 2 0807803 U

(51) Int. Cl.
    *B29C 65/74*   (2006.01)
    *B29C 65/00*   (2006.01)
    *B29C 65/02*   (2006.01)
    *B29C 65/04*   (2006.01)
    *B29L 31/48*   (2006.01)
    *B29K 27/06*   (2006.01)

(52) U.S. Cl.
    CPC ............ *B29C 65/04* (2013.01); *B29C 65/749* (2013.01); *B29C 65/7461* (2013.01); *B29C 66/0326* (2013.01); *B29C 66/1122* (2013.01); *B29C 66/242* (2013.01); *B29C 66/43* (2013.01); *B29C 66/73921* (2013.01); *A41D 2400/52* (2013.01); *B29C 66/949* (2013.01); *B29C 2793/009* (2013.01); *B29K 2027/06* (2013.01); *B29L 2031/4864* (2013.01)

(56) References Cited

U.S. PATENT DOCUMENTS

| | | | |
|---|---|---|---|
| 2017/0009028 A1* | 1/2017 | Wolf | B29C 47/0004 |
| 2017/0135425 A1* | 5/2017 | Hao | A41D 19/0096 |
| 2017/0313848 A1* | 11/2017 | Pfeiffer | C08K 5/0016 |

FOREIGN PATENT DOCUMENTS

| | | |
|---|---|---|
| CN | 102551238 A | 7/2012 |
| CN | 1202375094 A | 8/2012 |
| CN | 102964719 A | 3/2013 |
| CN | 203266977 U | 11/2013 |
| CN | 103610245 A | 3/2014 |
| CN | 103720089 A | 4/2014 |
| CN | 203592753 U | 5/2014 |
| CN | 203650963 A | 6/2014 |

* cited by examiner

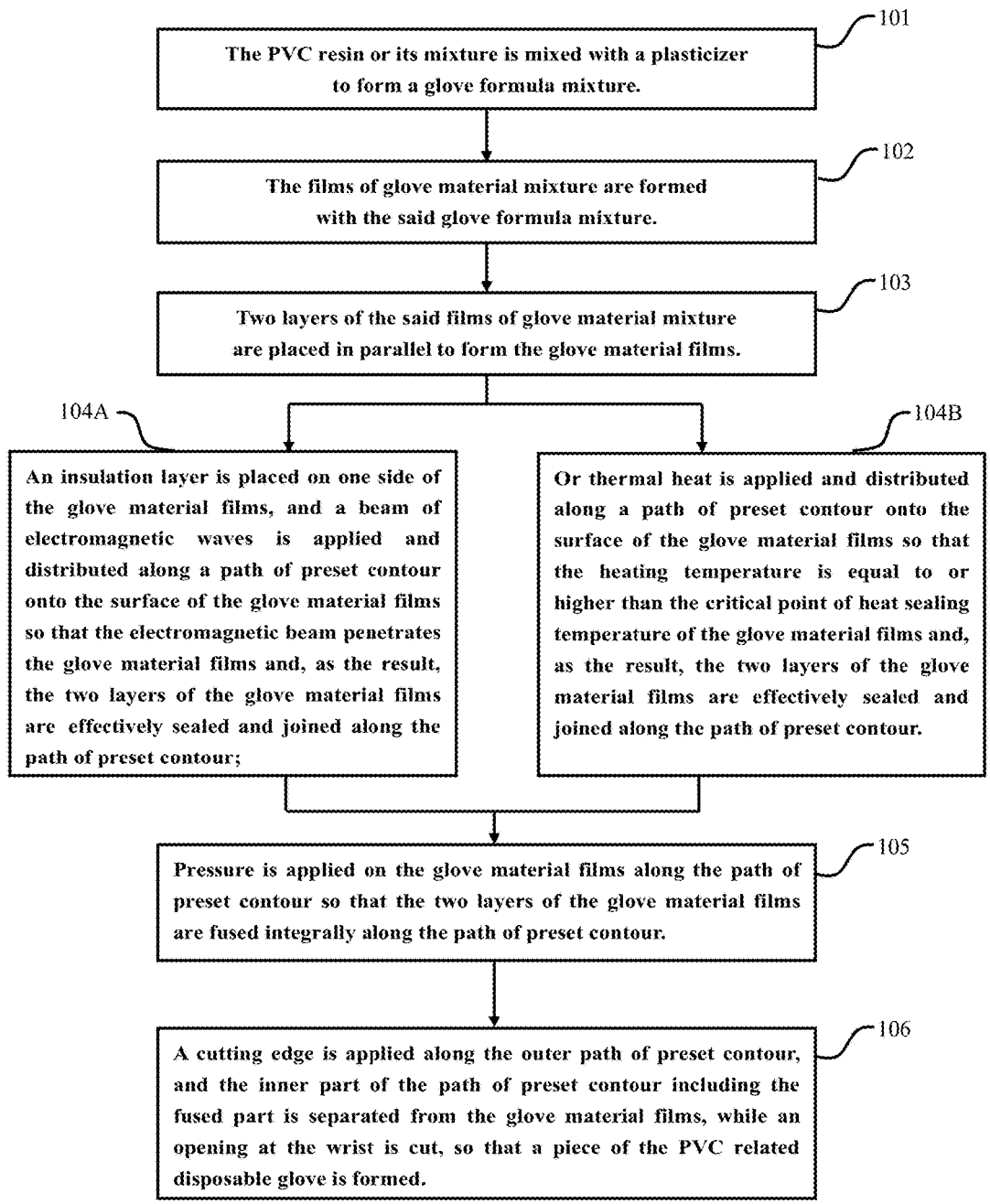

PVC DISPOSABLE GLOVE AND MANUFACTURING PROCESS THEREOF

TECHNOLOGICAL FIELD

The present invention relates to the field of disposable gloves, particularly, PVC (polyvinyl chloride) related disposable gloves and its manufacturing process.

BACKGROUND TECHNOLOGIES

PVC related disposable glove is a widely used everyday product. PVC Related Disposable gloves refer to the disposable gloves that are made with a PVC resin mixture, a mixture of PVC resin and other materials, as the raw materials. The other materials refer to any plastic products that compatible with PVC resin. When the mixing ratio of other materials is 0, the so called mixture becomes pure PVC resin, but in this article it is also referred to as PVC related resin mixture. The disposable gloves made with a mixture of PVC resin and other compatible materials have equal or similar performances with that of the disposable gloves made with pure PVC resin.

PVC related disposable gloves have good properties in elasticity and strength. They are comfortable and convenient to use for hand protections, therefore are widely used in the fields of domestic usages, hospitals and food industries.

Currently the commonly applied traditional manufacturing process for manufacturing the PVC related disposable gloves include the following steps:

Step 1. Mixing a PVC resin with a plasticizer such as octyl phthalate (DOP) or diisononyl phthalate (DINP) or any other plasticizers to form a paste, and the purpose is to make the gloves soft.

Step 2. Adding large amount of viscosity modifier, a type of low aromatic solvent oil, into the paste mentioned above to make it thinner and become the diluted paste, in order to reduce the glove weights.

Step 3. Pumping the diluted paste mentioned above into a dipping tank.

Step 4. Using a chain to drive many ceramic, or metal, hand shaped glove formers into the dipping tank, so that the lower part of the formers is coated with a layer of thinned paste.

Step 5. Driving the formers with the chain into an oven for heating them up, evaporating the viscosity modifier solvent from the paste layer, and making the layer of the thinned paste on the surface of the formers become a thin plastic film according to the shape of hand shaped formers.

Step 6. Chaining the formers with the plastic films on the surfaces out of the oven for cooling down.

Step 7. Peeling the plastic films on the former surfaces manually or automatically to pick up the formed gloves and counting and packing them.

Step 8. Driving the clean formers after the gloves are peeled into the dipping tank again to make them go into the next production cycle.

The above conventional manufacturing process for the PVC related disposable gloves was invented in the United States at the beginning of the last century. It is a typical outdated manufacturing process with high pollution and high labor intensity. The industry of manufacturing PVC related disposable gloves migrated to the Mainland China from Taiwan in the 1980's and 1990's. Since then, about 98% of the production capacity of this industry worldwide has been relocated into China but the conventional manufacturing process has not been principally changed. The disadvantage of this conventional process is using large amounts of a type of oil as the solvent or "viscosity modifier" added into the paste of material mixture. The only purpose for adding the solvent oil is to make the paste thinner to reduce glove thicknesses and weights. The solvent oil is completely evaporated in the oven and released into the atmosphere. This is the so called volatile organic compounds (VOC) which forms smog and causes serious air pollutions.

According to the actual production statistics, the average VOC emission is about 0.26 tons per every ton of PVC Disposable gloves made with the conventional process described above, which will go directly into the atmosphere as a pollutant. The annual production output of the PVC disposable gloves is about 500 thousand tons, which means about 130 thousand tons of VOC pollutants emitted into the atmosphere every year in China. It is extremely difficult and financially impossible to effectively recover these contaminants with the existing technologies. This pollutant is also very difficult to degrade in the atmosphere. It normally takes more than five years for their complete degradation. This VOC pollutant floating in the air reacts with sulfuric acid and nitric acid to form haze or smog and PM2.5 particles which cause great harm to human health. In China, wherever the PVC Disposable gloves factories are concentrated, the air qualities are all among the worst areas, where one of the pollution sources is the VOC emissions from the manufacturing process of the PVC disposable gloves.

At the same time, the solvent oil or viscosity modifier completely evaporated in the oven of this conventional manufacturing process of the PVC Disposable gloves represents nearly 20% the total cost of the gloves. The high-speed operation of the production line driven by the former chain makes the operators always work in a high intensive way. In the summer, the heat emission from the ovens makes the operators working in extremely harsh environment at the room temperature up to 50° C. that heatstroke occurs frequently among the operators.

This outdated manufacturing process for PVC disposable gloves exists all over China this way without any principle changes till today, resulting in large amounts of pollutions and other series of disastrous consequences in the society. It is necessary to develop a new process with model technology to replace this old method for less pollution and other social benefits.

THE INVENTIONS

The objective of the present invention is to provide the PVC related disposable gloves and a new manufacturing process, which can eliminate the air pollution and improve the working environment for the workers, and to reduce production costs of The PVC related disposable gloves.

An example of embodiment of the present invention provides a new manufacturing process for The PVC related disposable gloves, which comprises the following steps:

The PVC resin or its mixture is mixed with a plasticizer to form a glove formula mixture.

The films of glove material mixture are formed with the said glove formula mixture.

Two layers of the said films of glove material mixture are placed in parallel to form the glove material films.

An insulation layer is placed on one side of the glove material films, and a beam of electromagnetic waves is applied and distributed along a path of preset contour onto the surface of the glove material films so that the electromagnetic beam penetrates the glove material films and, as the result, the two layers of the glove material films are effectively sealed and joined along the path of preset contour;

Or thermal heat is applied and distributed along a path of preset contour onto the surface of the glove material films so that the heating temperature is equal to or higher than the critical point of heat sealing temperature of the glove material films and, as the result, the two layers of the glove material films are effectively sealed and joined along the path of preset contour.

Pressure is applied on the glove material films along the path of preset contour so that the two layers of the glove material films are fused integrally along the path of preset contour.

A cutting edge is applied along the outer path of preset contour, and the inner part of the path of preset contour including the fused part is separated from the glove material films, while an opening at the wrist is cut, so that a piece of the PVC related disposable glove is formed.

Preferably, while applying an electromagnetic beam and a pressure to the glove material films along the path of preset contour, the glove material films is preheated to but not exceeding 120° C.

Preferably, the step of forming the films of glove material mixture with the glove formula mixture comprises the methods of calendaring, blowing, or casting in making the PVC films.

Preferably, the process further comprises collecting the plasticizer vapor during the step of forming the films of glove material mixture with the glove formula mixture. The method could be using the electrostatic power to collect the liquid plasticizer droplets formed by lowering the plasticizer vapor temperature.

Preferably, the step of applying a beam of electromagnetic waves on the surface of the glove material films comprises that the glove material films are fed into the space between two electrodes for which one of the two said electrodes persists a shape corresponding to the path of preset contour, and a beam of electromagnetic waves with the frequencies of 27.12 MHz or 40.68 MHz is applied between the two said electrodes.

Whenever a beam of electromagnetic waves is applied on the surface of the glove material films, the step of applying pressure to the path of preset contour comprises that one of the two said electrodes can move towards the other electrode so that the glove material films are pressed between two electrodes.

Preferably, the step of applying thermal heat along a path of preset contour onto the surface of the glove material films comprises that the heating temperature reaches to or passes the critical point of heat sealing temperature of the glove material films within 2 seconds, and then keeps heating for a period of time between 0.05 seconds and 5.0 seconds before the heating is stopped.

The step of applying thermal heat and pressure along a path of preset contour onto the surface of the glove material films comprises that the glove material films are fed into the space between a stationary template and a moving template, and one of the two templates is mounted with a metal mold with a path of preset contour. The moving template moves towards the stationary template so that the glove material films are pressed between the two templates.

Preferably, the step of glove separation of the inner part of the path of preset contour and the fused part from the glove material films comprises that a tool holding the films in place and a pressing or a tensile force is applied vertically to the inner part of the path of preset contour and the fused part to separate it from the glove material films.

Preferably, the process further comprises counting the said The PVC related disposable gloves separated.

Preferably, the said plasticizers include dioctyl phthalate (DOP) and/or diisononyl phthalate (DINP) and/or dioctyl phthalate (DOTP) and/or 1,2-cyclohexane dicarboxylic acid isononyl ester (DINCH). The said glove formula mixture consists of 100 parts of PVC resin, or its mixture, and 50 parts of the said plasticizers or more in weight.

This example of embodiment of the present invention provides a type of new PVC related disposable gloves, which are manufactured through this new manufacturing process, including placing two layers of the glove material films in parallel, applying a beam of electromagnetic waves along a path of preset contour onto the surface of the glove material films so that the two layers of the glove material films are effectively sealed and joined along the path of preset contour; OR, applying thermal heat along a path of preset contour onto the surface of the glove material films so that the two layers of the glove material films are effectively sealed and joined along the path of preset contour. The said PVC related disposable glove persists a fused seam throughout the entire edge of the said glove.

The above example of embodiment of the present invention of the PVC related disposable glove manufacturing process has the following beneficial effects:

First, the raw materials used in making the PVC related disposable gloves no longer contain any solvent oil, the viscosity modifier, so that the solvent oil caused air pollution is completely avoided. If all the factories making the PVC related disposable gloves apply this new technology, the annual reduction of VOC emissions to the atmosphere is about 130,000 tons in China, which is a vary valuable contribution to the pollution controls and environmental protection.

Second, the plasticizers such as DOP, DINP, DOTP or DINCH used in production of PVC related glove material films at a high temperature about 200° C. will produce a small amount of vapor, about 2% or 3% of the plasticizers in weight, which could pollute air. Fortunately, these plasticizers have large enough molecule chains that their vapors could be easily collected by using the electrostatic power for catching the liquid plasticizer droplets formed by lowering the plasticizer vapor temperature. This makes it basically a pollution free process.

Third, no solvent oil is used as the viscosity modifier in the new process can sizably reduce production costs of the PVC related disposable gloves. In addition, the plasticizer vapor recovery can also further reduce the production costs of the PVC related disposable gloves.

Fourth, the energy consumption is greatly reduced with this new process because no oven is needed anymore for heating up the ceramic formers and gloves. And the pollution caused by the energy consumption is also reduced.

Fifth, this new process improves the working environment for the production workers, because it does not use a big oven for heating purpose so the shop temperature is not high, and also there is no evaporation of the viscosity modifiers into the shop to cause room air pollution.

Sixth, this new process reduces the labor intensity of the operators because it is unnecessary to remove the PVC related disposable gloves manually from the formers.

Seventh, the glove material films are preheated to a temperature not exceeding 120° C. to help the seams firmly fused to get higher strength of the finished products.

Eighth, when applying the high-frequency electromagnetic wave method, an insulation layer is placed between the glove material films and one electrode to prevent sparks caused by the high-frequency electromagnetic wave transmission process in order to avoid damages to the palm molds and affect the product quality; When applying the thermal heat method, an insulation layer is placed between the glove material films and the template to prevent the glove material films from high temperature decomposition and heat loss. The instantaneous heating cycle is short. For example, the instantaneous heating time in about two seconds if the glove material thickness is 0.06 mm.

Ninth, the said PVC related disposable gloves separated from the glove material films are counted automatically to make it easy for the following step of glove packaging for a certain number.

FIGURE DESCRIPTIONS

FIG. 1 is a flowchart of an embodiment example of the present invention of manufacturing processes for PVC related disposable gloves.

DETAILED DESCRIPTIONS OF THE EMBODIMENTS

The present invention is further described in details with the following specific embodiment example and the figure.

As shown in FIG. 1, the embodiment example of the present invention of the manufacturing process for the PVC related disposable gloves comprise the following steps:

Step 101, the PVC resin or its mixture is mixed with a plasticizer to form a glove formula mixture.

Step 102, the films of glove material mixture is formed with the said glove formula mixture.

Step 103, two layers of the said films of glove material mixture are placed in parallel to form the glove material films.

Step 104A, an insulation layer is placed on one side of the glove material films, and a beam of electromagnetic waves is applied and distributed along a path of preset contour onto the surface of the glove material films so that the electromagnetic beam penetrates the glove material films and, as the result, the two layers of the glove material films are effectively sealed and joined along the path of preset contour; OR Step 104B, thermal heat is applied and distributed along a path of preset contour onto the surface of the glove material films so that the heating temperature is equal to or higher than the critical point of heat sealing temperature of the glove material films and, as the result, the two layers of the glove material films are effectively sealed and joined along the path of preset contour.

Step 105, pressure is applied on the glove material films along the path of preset contour so that the two layers of the glove material films are fused integrally along the path of preset contour.

Step 106, a cutting edge is applied along the outer path of preset contour, and the inner part of the path of preset contour including the fused part is separated from the glove material films, while an opening at the wrist is cut, so that a piece of the PVC related disposable glove is formed.

The said PVC related disposable gloves can be made along the path of preset contour as the glove outer edge after the above steps.

As described above, the PVC related disposable gloves made with this new process consist two sheets of the glove material films placed in parallel. The two sheets of the glove material films are fused and sealed together along the path of preset contour by applying a beam of electromagnetic waves, or by thermal heating to or above the critical temperature of the glove material films, so that a fused seam throughout the entire edge of the glove is formed. There is no such a fused seam on the PVC related disposable gloves made with the conventional manufacturing process. This is a clear distinction between the PVC related disposable gloves made with this new process and that made with the existing technology.

The said new glove manufacturing process has the following beneficial effects:

First, the raw materials used in making the PVC related disposable gloves no longer contain any solvent oil, the viscosity modifier, so that the solvent oil caused air pollution is completely avoided. If all the factories making the PVC related disposable gloves apply this new technology, the annual reduction of VOC emissions to the atmosphere is about 130,000 tons in China, which is a vary valuable contribution to the pollution controls and environmental protection.

Second, the plasticizers such as DOP, DINP, DOTP or DINCH used in production of PVC related glove material films at a high temperature about 200° C. will produce a small amount of vapor, about 2% or 3% of the plasticizers in weight, which could pollute air. Fortunately, these plasticizers have large enough molecule chains that their vapors could be easily collected by using the electrostatic power for catching the liquid plasticizer droplets formed by lowering the plasticizer vapor temperature. This makes it basically a pollution free process.

Third, no solvent oil is used as the viscosity modifier in the new process can sizably reduce production costs of the PVC related disposable gloves. In addition, the plasticizer vapor recovery can also further reduce the production costs of the PVC related disposable gloves.

In Step 101, the said plasticizers could be any type, including dioctyl phthalate (DOP) and/or diisononyl phthalate (DINP) and/or dioctyl phthalate (DOTP) and/or 1,2-cyclohexane dicarboxylic acid isononyl ester (DINCH).

The said glove formula mixture consists of 100 parts of PVC resin, or its mixture, and 50 parts of the said plasticizers or more in weight. The gloves made with the said formula persist suitable softness and are easy to be fused.

The method of glove separation of the inner part of the path of preset contour and the fused part from the glove material films can specifically be that a tool holding the films in place and a pressing or a tensile force is applied vertically to the inner part of the path of preset contour and the fused part to separate it from the glove material films.

The said PVC related disposable gloves separated from the glove material films can be counted automatically to make it easy for the following step of glove packaging for a certain number in order to reduce the working intensity of the workers and raise the production efficiency..

In Step 102, the films of glove material mixture made from the glove formula mixture can be formed with the calendaring, blowing, or casting methods.

In addition, a small part of the plasticizer used in the process can be evaporated during the step of forming the films of glove material mixture with the glove formula mixture, and this part of vapor can also pollute air but can be completely collected with the following method.

Collecting the plasticizer vapor during the step of forming the films of glove material mixture from the glove formula mixture;

Lowering the collected plasticizer vapor temperature to force it becoming oil droplets;

Collecting the said oil droplets with an electrostatic precipitator.

The evaporated plasticizer can be completely recovered by the above method and can be used as the recycled material for making new PVC related disposable gloves in order to save production costs, while also to reduce pollution.

In Step 104A, an insulation layer is placed between the glove material films and one electrode to prevent sparks caused by the high-frequency electromagnetic wave transmission process in order to avoid damages to the palm molds and affect the product quality.

Also in Step 104A, the methods of applying the high-frequency electromagnetic waves can be in any ways, for example, including the following way:

The glove material films are fed into the space between two electrodes and a beam of electromagnetic waves is conducted between the two electrodes. The frequencies of the beam of electromagnetic waves can be in any values providing the glove material films can be fused and sealed effectively, such as the frequencies of 27.12 MHz or 40.68 MHz in industrial standards.

In Step 104B, the heating temperature ranges are relevant to the formula of the glove material films. For some specific glove material films, the two layers of the glove material films can be jointed effectively when the heating temperature reaches 80° C., which is the critical temperature of the said glove material films In Step 104B, applying thermal heat along a path of preset contour onto the surface of the glove material films includes that the heating temperature reaches to or passes the critical point of heat sealing temperature of the glove material films within 2 seconds, and then keeps heating for a period of time between 0.05 seconds and 5.0 seconds before the heating is stopped.

In Step 105, the method of applying pressure on the glove material films can be in any ways, for example, including the way that one of the two templates possesses the shape of the path of preset contour, which can be determined according to the product shapes.

Then one of the two templates moves towards the other one, and press the glove material films between the two templates.

For example, in Step 105, the way of applying pressure on the glove material films along the path of preset contour includes that the glove material films are fed into the space between a stationary template and a moving template, and one of the two templates is mounted with a metal mold with a preset contour. The moving template moves towards the stationary template so that the glove material films are pressed between the two templates.

Also, while applying a pressure to the glove material films along the path of preset contour, the glove material films can be preheated to but not exceeding 120° C. Proper preheating the glove material films helps to firmly fuse the film on the seams and raise the strength of the finished products.

An embodiment example of the invention is illustrated with specific implementing equipment below.

1. The PVC resin mixture, which could be a pure PVC resin or a mixture of PVC resin with other materials, is mixed with a plasticizer such as DOP or DINP to form a paste of the glove formula mixture. No solvent oil is needed as the viscosity modifier.
2. The said paste of the glove formula mixture is fed into a thin PVC film machine, which can be any type such as a calendaring, blowing, or casting type of machines for making the thin PVC films, to make the mixture films of certain thickness and softness.
3. A funnel-shaped hood is installed over the PVC film machine to capture the very small amount of the plasticizer vapor produced in the process of making the thin PVC films from the glove formula mixture.
4. The very small amount of plasticizer vapor captured in the above step is cooled down to generally within the range of 30-60° C., so that the plasticizer vapor forms oil droplets.
5. The plasticizer vapor cooled down in the above step is introduced into an electrostatic precipitator, and the oil droplets get some positive charges inside it. The oil droplets are adsorbed onto the negative electrode plates of the electrostatic precipitators, and flow down along the negative electrode plate to a plasticizer recovery barrel.
6A. Two layers of the thin PVC mixture films, i.e. the said glove material films, made in Step 2 are fed into a forming machine of PVC related disposable gloves with high frequency electromagnetic waves, and passed through the space between the two electrodes that can open or close by moving one of the them. A palm shaped non-ferrous metal mold is installed on the moving one of the two electrodes, which moves toward the stationary electrode periodically to make the two in close state so that the energy of the beam of electromagnetic waves penetrates the two layers of the glove material films along the palm shaped path of preset contour of the non-ferrous metal mold. The polarized PVC polymer molecules are forced to oscillate with the same frequency by the energy of electromagnetic waves along this path and are internally heated and mixed by the oscillations and internal frictions of the molecules so that the two layers of the films are fused together. Preheating to but not exceeding 120° C. and certain pressure are applied on the path of the non-ferrous metal mold help the two layers of the films further fused together. Then a piece of the said PVC related disposable gloves is formed. OR
6B. Thermal heat is applied and distributed along a path of preset contour of the metal mold onto the surface of the glove material films, and the heating temperature is equal to or higher than the critical point of heat sealing temperature of the glove material films. A mechanical force is also applied to the metal mold to help the two layers of the films further sealed together. As the result, the two layers of the glove material films are effectively sealed and joined along the path of preset contour of the metal mold to form a piece of the said PVC disposable gloves.
7. The said PVC disposable gloves can not be separated completely from the surrounding glove material films as the scrap materials with the above-described process. In order to avoid the high labor intensity and costs and low production efficiencies with manual separations, the gloves and their connecting scrap film materials are fed into an automatic separator, which makes the separated gloves fall into a glove receiving box and the scrap film materials rolled up for being recycled to make new PVC disposable gloves after re-melted.

8. An infrared counter is installed on the rotating shaft of the automatic glove separator applied in the above-described process, which counts once whenever the PVC disposable gloves are separated each time. When the separated PVC disposable gloves reach certain numbers, the gloves automatically fall into a box beneath the glove receiving box, and the belt beneath the box moves a certain distance forward.

9. The PVC disposable gloves counted and separated with certain numbers in the above-described process are transported to an automatic packaging machine and packed in carton boxes following the customer's requirements for storages. The present invention is applicable not only to make the disposable gloves made from the films of PVC and its mixtures, and also suitable to make the disposable gloves from the films of TPU, PU, PETG; PET, EVA and other polarized plastic materials, and their mixtures thereof with other plastic materials.

The foregoing descriptions are only for some preferred embodiments of the present invention, but not for limiting this invention. For any technical personnel skilled in this area, it is not difficult to make various changes and variations of the present invention. Any modifications, equivalent replacements, or improvements within the spirit and principles of the present invention should be included within the protection scope of the present invention.

What is claimed is:

1. A manufacturing process for PVC related disposable gloves, comprisingthe following steps: mixing a PVC resin or a PVC resin mixture with a plasticizer to form a glove formula mixture; forming films of glove material with the said glove formula mixture; placing two layers of the said films of glove material in parallel to form glove material films; placing an insulation layer on one side of the parallel placed glove material films, and applying a beam of electromagnetic waves along a path of preset contour onto a surface of the glove material films so that the electromagnetic beam penetrates the glove material films and, as the result, the two layers of the glove material films are effectively sealed and joined along the path of preset contour; applying pressure on the glove material films along the path of preset contour so that the two layers of the glove material films are fused integrally along the path of preset contour; applying a cutting edge along the outer path of preset contour, and the inner part of the path of preset contour is separated from the glove material films, while an opening at the wrist is cut, so that a piece of the PVC related disposable glove is formed.

2. The process of claim 1, wherein while applying a pressure to the glove material films along the path of preset contour, the glove material films is preheated to but not exceeding 120° C.

3. The process of claim 1, wherein the step of forming the films of glove material mixture with the glove formula mixture comprises the methods of calendaring, blowing, or casting in making the material mixture films.

4. The process of claim 1, wherein the process further includes: the step of capturing a plasticizer vapor produced in the process of making the films of glove material from the glove formula mixture; wherein the plasticizer vapor captured in the above step is cooled down so that the plasticizer vapor forms oil droplets; and wherein an electrostatic precipitator is applied to recover the oil droplets formed with the plasticizer vapor.

5. The process of claim 1, wherein the step of applying a beam of electromagnetic waves to the glove material films includes: feeding theglove material films into the space between two electrodes and a beam of electromagnetic wave with the frequencies of 27.12 MHz or 40.68 MHz is applied between the two said electrodes wherein one of the two said electrodes possess a shape of the preset contour.

6. The process of claim 5, wherein the step of applying pressure on the said path of preset contour includes: moving one of the two said electrodes towards the other one and pressing the two layers of the glove material films between the electrodes.

7. The process of claim 1, wherein the step of glove separation of the inner part of the path of preset contour and the fused part from the glove material films includes: holding the films in place with a tool; and, applying a pressing or a tensile force vertically to the inner part of the path of preset contour and the fused part to separate it from the glove material films.

8. The process of claim 1, wherien the process further includes: automatically counting the separated PVC related disposable gloves.

9. The process of claim 1, wherein the plasticizer is selected from the group consisting of: dioctyl phthalate (DOP), diisononyl phthalate (DINP), dioctyl phthalate (DOTP), and/or 1,2-cyclohexane dicarboxylic acid isononyl ester (DINCH), or combinations thereof; and wherein the said glove formula mixture consists of 100 parts of PVC resin, or a PVR resin mixture, and 50 parts of the said plasticizers or more in weight.

10. A manufacturing process for PVC related disposable gloves, comprising the following steps: mixing a PVC resin with a plasticizer to form a glove formula mixture; forming films of glove material with the said glove formula mixture; placing two layers of the said films of glove material mixture in parallel to form the glove material films; applying thermal heat, distributed along a path of preset contour onto the surface of the glove material films, so that the heating temperature is equal to or higher than the critical point of heat sealing temperature of the glove material films and, as the result, the two layers of the glove material films are effectively sealed and joined along the path of preset contour; applying pressure on the glove material films along the path of preset contour, by feeding the glove material films into a space between a stationary template and a moving template, and one of the two templates is mounted with a metal mold with a path of preset contour; and moving the moving template towards the stationary template so that the glove material films are pressed between the two templates so that the two layers of the glove material films are fused integrally along the path of preset contour; applying a cutting edge along the outer path of preset contour, and the inner part of the path of preset contour including the fused part is separated from the glove material films, while an opening at the wrist is cut, so that a piece of the PVC related disposable glove is formed.

11. The process according to claim 10, wherein the step of applying thermal heat on the glove material films along the path of preset contour includes: applying thermal heat along a path of preset contour onto the surface of the glove material films so that the heating temperature reaches to or passes the critical point of heat sealing temperature of the glove material films within 2 seconds, and the keeps heating for a period of time between 0.05 seconds and 5.0 seconds before the heating is stopped.

12. The PVC disposable glove made by the process according to claim 1.

13. The PVC disposable glove made by the process according to claim 10.

\* \* \* \* \*